United States Patent [19]

Kikuchi et al.

[11] Patent Number: 5,719,646
[45] Date of Patent: Feb. 17, 1998

[54] METHOD OF AND APPARATUS FOR DECODING CODED MOVING PICTURE AND OUTPUTTING SAME WITH SUPPRESSED ERROR

[75] Inventors: Takafumi Kikuchi, Kokubunji; Tadashi Saitoh, Koganei; Yutaka Okunoki, Kawaguchi, all of Japan

[73] Assignees: Hitachi. Ltd.; Sega Enterprises, Ltd., both of Tokyo, Japan

[21] Appl. No.: 560,018

[22] Filed: Nov. 17, 1995

[30] Foreign Application Priority Data

Nov. 17, 1994 [JP] Japan ................... 6-283836

[51] Int. Cl.$^6$ .......................... H04N 7/12
[52] U.S. Cl. .................. 348/845.1; 326/416
[58] Field of Search ............. 348/384, 390, 348/400, 401, 402, 409, 415, 416, 466, 699, 845.1, 845; H04N 7/12

[56] References Cited

U.S. PATENT DOCUMENTS

| | | | |
|---|---|---|---|
| 5,455,629 | 10/1995 | Sun et al. | 348/845.1 |
| 5,497,404 | 3/1996 | Grover et al. | 348/845.1 |
| 5,502,493 | 3/1996 | Meyer | 348/409 |
| 5,517,250 | 5/1996 | Hoogenboom et al. | 348/845.1 |
| 5,534,937 | 7/1996 | Zhu et al. | 348/845.1 |
| 5,568,200 | 10/1996 | Pearlstein et al. | 348/466 |

FOREIGN PATENT DOCUMENTS

6-98313   9/1992   Japan .

*Primary Examiner*—Tommy P. Chin
*Assistant Examiner*—Luanne P. Din
*Attorney, Agent, or Firm*—Antonelli, Terry, Stout, & Kraus, LLP

[57] ABSTRACT

A train of coded input picture data carrying moving picture information includes at least one picture data which need to refer to another picture data and at least one coded picture data containing an error. Such a train of input picture data is decoded with the influence of the error minimized and outputted in predetermined order by using a method including the steps of (a) upon detection of an error in a first input picture data in the train of input picture data, skipping the first input picture data and succeeding input picture data without decoding them until a second input picture data which need to refer to no reference to another picture data for decoding appears, and outputting consecutively a third picture data inputted before the first input picture data and already decoded, (b) decoding the second input picture data and outputting the decoded picture data after the third decoded picture data outputted consecutively, and (c) skipping picture data succeeding said second input picture data without decoding them until a fourth input picture data which need to refer to no reference to another picture data for decoding or a fourth input picture data which need to refer to the second decoded picture data for decoding appears, and outputting consecutively a picture data obtained by decoding the second input picture data.

10 Claims, 9 Drawing Sheets

| VLC | INCREMENT VALUE |
|---|---|
| 1 | 1 |
| 011 | 2 |
| 010 | 3 |
| 0011 | 4 |
| 0010 | 5 |
| 0001 1 | 6 |
| 0001 0 | 7 |
| 0000 111 | 8 |
| 0000 110 | 9 |
| 0000 1011 | 10 |
| 0000 1010 | 11 |
| 0000 1001 | 12 |
| 0000 1000 | 13 |
| 0000 0111 | 14 |
| 0000 0110 | 15 |
| 0000 0101 11 | 16 |
| 0000 0101 10 | 17 |
| 0000 0101 01 | 18 |
| 0000 0101 00 | 19 |
| 0000 0100 11 | 20 |
| 0000 0100 10 | 21 |
| 0000 0100 011 | 22 |
| 0000 0100 010 | 23 |
| 0000 0100 011 | 24 |
| 0000 0100 000 | 25 |
| 0000 0011 111 | 26 |
| 0000 0011 110 | 27 |
| 0000 0011 101 | 28 |
| 0000 0011 100 | 29 |
| 0000 0011 011 | 30 |
| 0000 0011 010 | 31 |
| 0000 0011 001 | 32 |
| 0000 0011 000 | 33 |
| 0000 0001 111 | macroblock stuffing |
| 0000 0001 000 | macroblock escape |

METHOD OF AND APPARATUS FOR DECODING CODED MOVING PICTURE AND OUTPUTTING SAME WITH SUPPRESSED ERROR

BACKGROUND OF THE INVENTION

The present invention relates to a moving picture decoding apparatus for decoding coded moving pictures, and in particular to a moving picture decoding apparatus suitable for avoiding the influence of an error without degrading the quality of pictures outputted from the decoding apparatus when the error has been detected during decoding.

For storage of digitized picture data, an enormous storage capacity is generally needed. In the case of moving pictures, a further larger capacity will be needed. For coding, compressing and storing moving pictures, therefore, various techniques have been thought out.

The MPEG (Moving Picture Expert Group) video standard is one of them. According to this standard, data storage capacity for color moving pictures can be significantly reduced. For reducing the storage capacity, it uses the following techniques:

(1) two-dimensional compression using discrete cosine transformation;

(2) motion compensation based upon time-based prediction; and (3) entropy coding using variable length coding.

Details of the MPEG video standard are described in ISO/IEC 11172-1/2/3: Information Technology-coding of Moving Pictures and Associated Audio for Digital Storage Media at up to about 1.5 Mbit/s", International Standard, 1993.

Although a procedure for normally decoding pictures is described in this standard, it does not cover a case where an error occurs at the time of picture decoding. As for the detailed decoding procedure, see the above described standard.

As for the method for coping with the case where an error occurs, JP-A-6-98313 (laid-open on Apr. 4, 1994) is known. In the case where an unavoidable error is encountered at the time of decoding a picture which may be used as a reference picture, it is proposed in the publication to substitute a preceding reference picture for the reference picture in which the error has occurred.

As for causes of occurrence of errors at the time of picture decoding, the following cases may be considered:

(1) a case where there is a physical detect in a data storing medium such as a CD and consequently read-out data are too much destroyed to be recovered;

(2) a case where noises caused by disturbance are introduced into a signal which is being transmitted to cause data to be changed; and (3) a case where a method which does not conform to the standard was used at the time of coding and consequently data which should not originally appear are provided for decoding.

In such a case, continuation of decoding becomes impossible or decoded pictures become significantly different from original pictures.

In the data compression technique using time-based prediction which is one feature of the MPEG video standard, picture data themselves are not preserved as data in the tramsmission or storage medium, but a difference component between a preceding picture or a succeeding picture and a current picture is preserved as data in the tramsmission or storage medium, and the current picture is reproduced at the time of decoding by taking a preceding picture or a succeeding picture as a reference picture and by using the difference component.

Therefore, not only the MPEF video standard but also techniques for attempting compression of the amount of data coded by using time-based prediction have the following problem. When data destruction occurs at the time of decoding of a picture which may be referred to with a result that the picture to be outputted will be damaged, a resulting error will be sequentially propagated to succeeding pictures which refer to the damaged picture and the error will be in turn propagated to still succeeding pictures which refer to the above described other pictures. Thus, degradation of the picture quality as a moving picture will be caused, resulting in a serious problem.

In the MPEG video standard, types of coded pictures are classified into the following kinds:

(1) an intra-picture (hereafter simply referred to as I-picture) which does not use time-based prediction;

(2) a forwardly predictive picture (hereafter simply referred to as P-picture) which uses forward time-based prediction; and (3) a bidirectionally predictive picture (hereafter simply referred to as B-picture) which uses bidirectional time-based prediction.

Herein, "forward time-based prediction" means prediction of motion based upon a preceding I-picture or P-picture which is to be outputted prior to a picture under decoding, which has an output order nearest to that of the picture under decoding, and which has already been decoded. "Bidirectional time-based prediction" means prediction of motion based upon both the above described preceding I-picture or P-picture and a succeeding I-picture or P-picture which is to be outputted later than the picture under decoding, which has an output order nearest to that of the picture under decoding, and which has already been decoded.

Decoding of an I-picture does not need a reference picture, because it does not use the time-based prediction. Decoding of a P-picture is performed by using, as a reference picture, a preceding picture which is to be outputted prior to the P-picture under decoding, because it uses forward time-based prediction. At this time, a preceding I-picture or P-picture which has already been decoded and which is to be outputted prior to the P-picture under decoding is used as the reference picture. Decoding of a B-picture is performed by using, as reference pictures, both the above described preceding picture and succeeding picture. At this time, a preceding I-picture or P-picture which has already been decoded and which is to be outputted prior to the B-picture under decoding, and a succeeding I-picture or P-picture which has already been decoded and which is to be outputted later than the P-picture under decoding are used as the reference picture. Therefore, a B-picture is a picture which is to be outputted, being inserted between a preceding I-picture or P-picture and a succeeding I-picture or P-picture.

SUMMARY OF THE INVENTION

Figure 1:
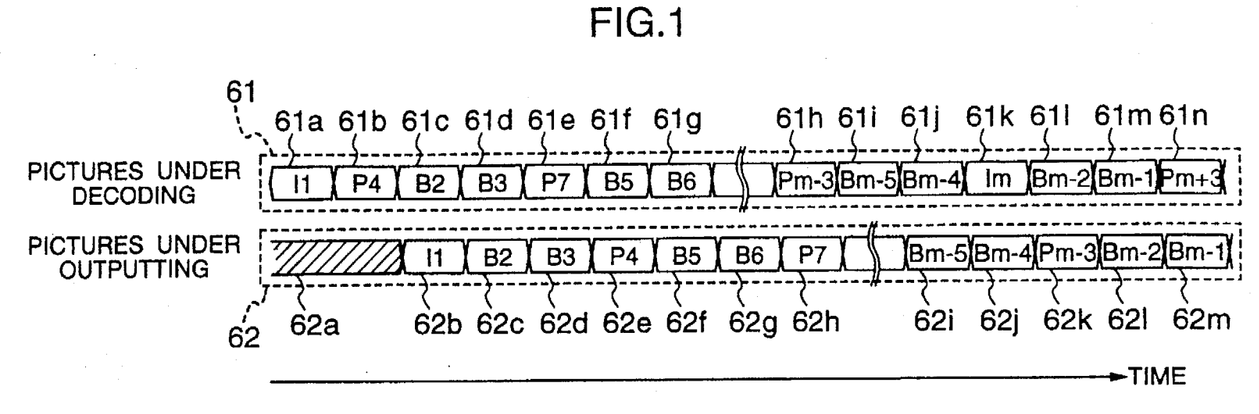
FIG. 1 is a timing chart showing an example of decoding of an MPEG video decoder which is an example of a moving picture decoding apparatus and an example of its picture data output.

FIG. 1 is a diagram showing an example of an order of decoding of input picture data, i.e., an order of inputted picture data and an order of outputted picture data, in a decoding apparatus which conforms to the MPEG video standard. In FIG. 1, numeral 61 denotes a train of picture data under decoding, and 61a through 61n denote individual picture data under decoding. Numeral 62 denotes a train of decoded picture data under outputting, and 62a through 62m denote individual decoded picture data under outputting. Character I, P or B added to each picture data indicates its type. A numeral following the type of each picture data indicates an order of output. The trains of picture data shown in FIG. 1 are exemplary. Picture data of respective types are not necessarily inputted in the order shown in FIG. 1. In the case of moving pictures involving slow motion, for example, B-picture data continue sometimes. On the contrary, in the case of moving pictures involving fast motion, I-picture data are often inputted consecutively.

In this example, a picture data 61a (I1) which does not need a reference picture data is first decoded. Subsequently, a picture data 61b (P4) is decoded by using the picture data 61a as a reference picture data. A picture data 61c (B2) is then decoded by using the picture data 61a and 61b as reference picture data. Subsequently, a picture data 61d (B3) is decoded by using the picture data 61a and 61b as reference picture data. A picture data 61e (P7) is then decoded by using the picture data 61b (P4) as a reference picture data.

In the present example, outputting of the decoded picture data is started after decoding of the picture data 61c (B2) has been started. A picture data 62a represents an initialized state and it is not a significant picture. Although the picture data 61b (P4) is decoded prior to the picture data 61c (B2) and 61d (B3), the picture data 61b (P4) is outputted later than pictures 62b (I1), 62c (B2) and 62d (B3).

Decoding is conducted in such a procedure. If any error occurs or is detected at the time of decoding the picture data 61a (I1), for example, and consequently false decoding is conducted, then the picture data 61b (P4), 61c (B2) and 61d (B3) obtained by using the picture data 61a (I1) as a reference picture data will also become erroneous. Furthermore, the error is transmitted to picture data 61e (P7), 61f (B5) and 61g (B6) which are obtained by using the picture data 61b (P4) as a reference picture data. In due course of time, a picture data 61k (Im) of I type which does not need a reference picture data appears. A picture data 61n (Pm+3) is obtained by using only the picture data 61k (Im) as a reference picture data. Thus an influence of the above described error is exerted upon up to a picture data 61m (Pm−1) preceding the picture data 61n (Pm+3). As a result, the picture quality of the moving pictures will be degraded.

The present invention has been made on the basis of the above described finding of the present inventors. An object of the present invention is to provide a moving picture decoding technique in a moving picture coding scheme using time-based prediction which can be, responsive to some error detected at the time of decoding, to avoid the influence of the error to suppress degradation of the picture quality.

The foregoing and other objects and novel features will become apparent by reference to the following description taken conjunction with the accompanying drawing.

According to one aspect of the present invention, a method of decoding a train of coded input picture data carrying moving picture information and outputting the decoded picture data in predetermined order, in which at least one picture data included in the train of coded input picture data needs reference to another picture data for decoding, includes the steps of: upon detection of an error in one picture data (hereafter referred to as a first input picture data) included in the train of input picture data, skipping the first input picture data and succeeding input picture data without decoding them until another input picture data (hereafter referred to as a second input picture data) needing no reference to still another picture data for decoding appears, and outputting consecutively another picture data (hereafter referred to as a third picture data) inputted prior to the first input picture data having the detected error and already decoded; decoding the second input picture data and outputting the decoded picture data after the third decoded picture data outputted consecutively; and skipping picture data succeeding the second input picture data without decoding them until fourth input picture data needing no reference to another picture data for decoding or until fourth input picture data referring to the second decoded picture data for decoding appears, and outputting consecutively picture data obtained by decoding the second input picture data, until the fourth input picture data is decoded and outputted.

In accordance with another aspect of the present invention, an algorithm is adopted such that the type of a picture data under decoding is determined when an error has been detected at the time of decoding. In the case where the picture data under decoding is an I-picture or P-picture which may be used as a reference picture data, input picture data are skipped until an I-picture needing no reference picture data appears after detection of the above described error. After that I-picture which has appeared is decoded, input picture data are skipped again until an I-picture or a P-picture further appears.

Even if an error is detected during decoding, input picture data are skipped until I-picture data needing no reference picture data appears and decoding is restarted for succeeding picture data. By using the above described algorithm, therefore, decoding can be conducted without degrading the picture quality.

DESCRIPTION OF THE PREFERRED EMBODIMENTS

Hereafter, embodiments of the present invention will be described by referring to drawing.

Figure 2:
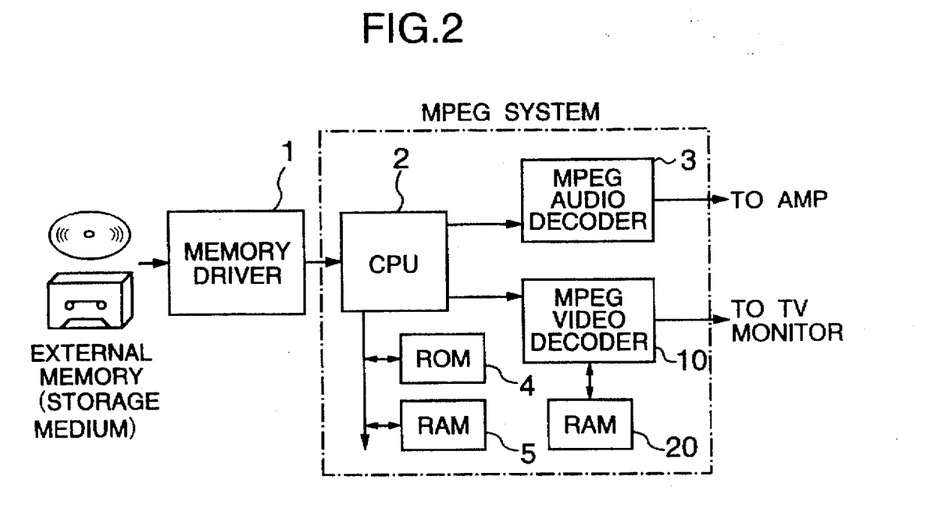
FIG. 2 is a block diagram showing an example of configuration of a moving picture reproduction system using a MPEG video decoder based upon the MPEG video standard as an example of a moving picture decoding apparatus for decoding coded moving picture data.
Figure 3:
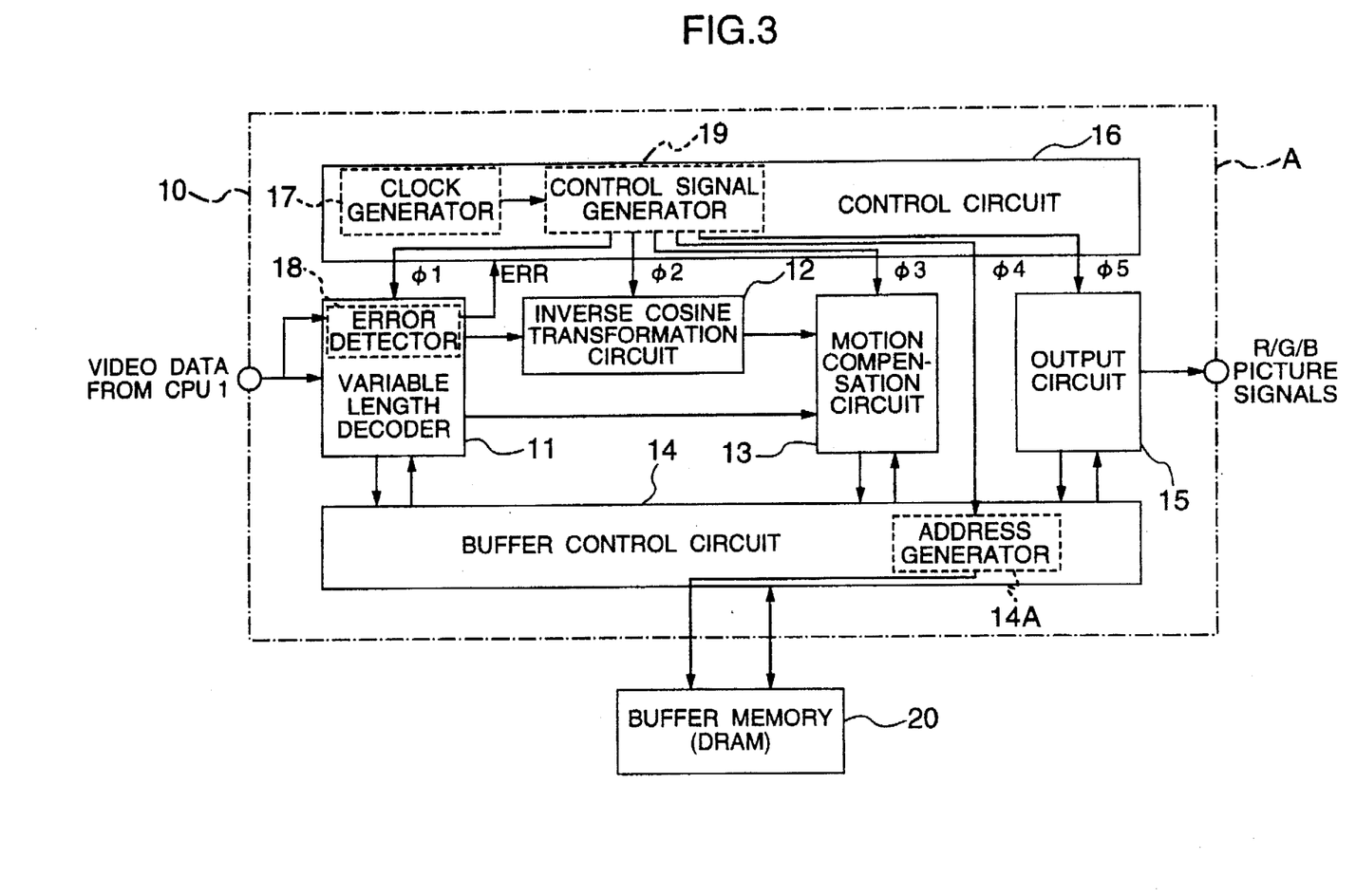
FIG. 3 is a block diagram of a MPEG video decoder according to an embodiment of the present invention.

FIG. 2 shows a moving picture reproduction system using a MPEG video decoder 10 based upon the MPEG video standard as an example of a moving picture decoding apparatus for decoding coded moving pictures. FIG. 3 shows a MPEG video decoder 10 according to an embodiment of the present invention. Although not especially restrictred, circuit blocks surrounded by a dotted line A in FIG. 3 may be formed on at least one semiconductor substrate such as silicon substrate to be in an IC form.

As shown in FIG. 2, the moving pocture reproduction system includes a driver 1 for reading out compressed and coded moving picture data stored in a storage medium such as a CD-ROM, a microcomputer 2 for separating picture data, voice data, and control information from data which are read out and decoding control information, a MPEG audio decoder 3 for decoding separated voice data, and a MPEG video decoder 10 for decoding separated moving picture data. The decoded moving picture signal is sent to a monitor such as a CRT display device. The decoded voice signal is sent to an audio amplifier.

Numeral 4 denotes a read only memory for storing a program executed by the microcomputer 2 and fixed data. Numeral 5 denotes a random access memory for providing a working area of the microcomputer 2. Numeral 20 denotes a buffer memory connected to the MPEG video decoder 10 to temporarily holding coded picture data.

An embodiment of a video decoder 10 which may be used in the moving picture reproduction system shown in FIG. 2 will now be described by referring to FIG. 3. In FIG. 3, numeral 11 denotes a variable length decoder capable of decoding picture data having an arbitrary length (arbitrary number of bits) supplied from the CPU 1. Numeral 12 denotes an inverse cosine transformation circuit for performing inverse cosine transformation on picture data compressed in frequency component (subjected to discrete cosine transformation) and converting the picture data to original picture data. Numeral 13 denotes a motion compensation circuit for converting pictures as occasion demands from preceding picture data or from preceding and succeeding picture data in accordance with whether picture data supplied from the decoder 11 and not subjected to discrete cosine transformation and picture data supplied from the transformation circuit 12 are I-picture data, P-picture data or B-picture data. Numeral 14 denotes a buffer control circuit having an address generator 14A responsive to a control signal $\phi 4$ supplied from the later described control circuit 16 to generate an address signal to be supplied to the buffer memory 20 and serving to store picture data, converted (motion-compensated) in accordance with the address signal, in an external buffer memory 20 and reading out the converted (motion-compensated) picture data as occasion demands. Numeral 15 denotes an output circuit for generating and outputting picture signals such as RGB signals on the basis of decoded picture data.

Numeral 16 denotes an internal control circuit. The internal control circuit generates a plurality of control signals $\phi 1$, $\phi 2$, $\phi 3$, $\phi 4$ and $\phi 5$ for sequentially controlling the above described circuits and causes picture data to be decoded in accordance with a predetermined algorithm. The internal control circuit 16 has a clock generator 17. By using a clock generated by the clock generator 17 as a reference, the internal control circuit 16 produces the above described control signals. By the way, each of $\phi 1$ through $\phi 5$ does not represent a single signal but represents a plurality of signals collectively. The buffer memory 20 may be formed by using a general purpose DRAM (dynamic random access memory), for example. Alternately, this buffer memory 20 may be incorporated into the MPEG video decoder to implement the whole as a single chip. The buffer memory 20 stores decoded picture data. The buffer memory 20 may include in some cases three frame memories (three data storage areas), i.e., two for storing I-picture data and P-picture data which may be be used as reference data and one for storing B-picture data. The buffer memory may includes in some other cases four frame memories (four data storage areas) for storing I-picture data, P-picture data and B-picture data, irrespective of the type of the picture data. Thus, the buffer memory 20 may include a different number of frame memories (storage areas). However, the present invention may be applied to any of those cases.

In the moving picture decoding apparatus 10 of this embodiment, the variable length decoder 11 has an error detector 18. Upon detecting non-standard input compressed picture data, the error detector 18 outputs an error detection signal ERR.

Figure 4:
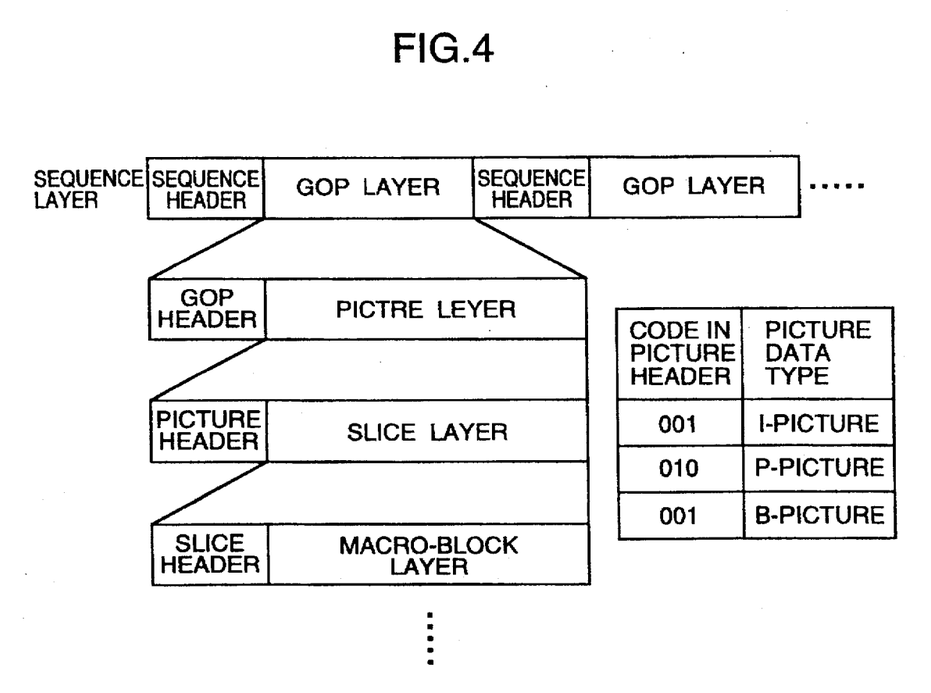
FIG. 4 is a diagram showing an example of a hierarchical structure of data conforming to the MPEG video standard.

An example of the error detector will now be described. In the MPEG video standard, for example, a hierarchical structure of picture data has been determined as shown in FIG. 4. A sequence layer located at the highest level in hierarchy includes sequence headers and data of GOP (Group Of Pictures) layers. Each sequence header has information such as the size of pictures of that sequence and display period. The GOP layers are located at the level subordinate to the sequence layer in the hierarchy. Each GOP layer includes a GOP header and a picture layer. The GOP header includes time information from the head of the GOP sequence. The picture layer is located at the level subordinate to the GOP layer in the hierarchy. The picture layer includes a picture header and a slice layer. The picture header includes information indicating an order of that picture in the GOP and information indicating the picture type. The slice layer is located at the level subordinate to the picture layer in the hierarchy. The slice layer includes a slice header and a macro-block layer. As shown in FIG. 4, code "001" in the picture header indicates that the picture data in question is an I-picture data. Similarly, codes "010" and "011" in the picture header indicate that the picture data are P-picture data and I-picture data, respectively.

At the head of each hierarchical layer, data having a specified value called a start code is located. For example, at the head of the sequence header, data having a code value 000001B3 (H) called SHC (Sequence Header Code) is located. Here, (H) represents that the antecedent number is a hexadecimal number. In the same way, data having a code value 000001B8 (H) called GSC (Group Start Code) is located at the head of the GOP header. At the head of the picture header, data having a code value 00000100 (H) called PSC (Picture Start Code) is located.

Besides the start codes, some codes which can be predicted to appear are present in data of the MPEG video standard. If a pattern does not appear in a position where it is obviously predicted that a code having a specific value appears, the possibility that the data will contain an error can be judged to be high. In such a case, the error detector 18 generates an error detection signal ERR.

Figure 5:
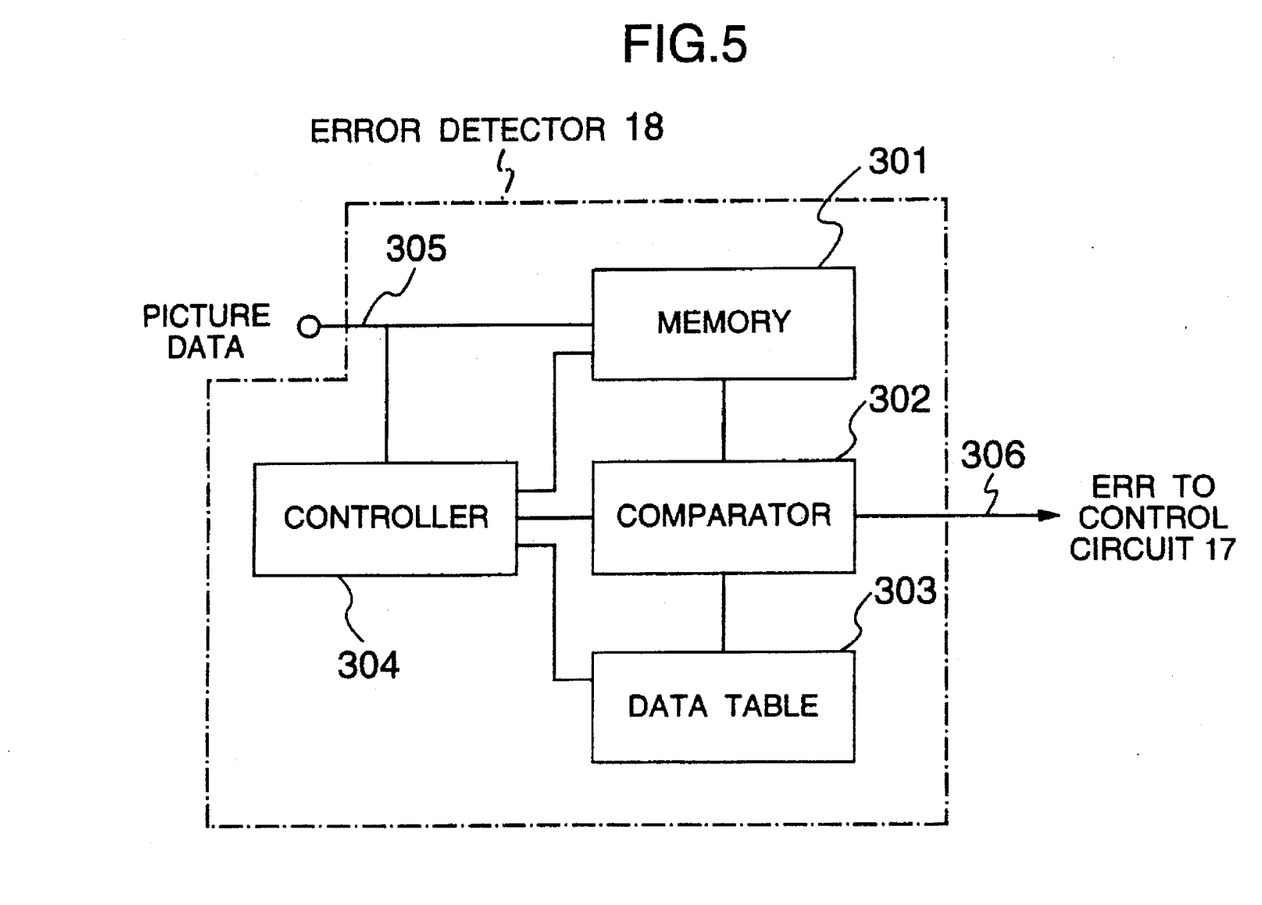
FIG. 5 is a diagram showing an example of an error detector which may be used in the embodiment shown in FIG. 3.

Taking the picture header as an example, codes "000", "101" are reserved, and therefore, unused. Thus, when a picture header having one of these codes is supplied to the memory 301, the comparator 302 will make reference to the picture header codes in the data table 303 and compare the code of the supplied picture header with the picture header codes in the data table to determine that the picture data with the above-mentioned picture header contains an error and generates an error signal (ERR).

An example of circuit of the error detector is shown in FIG. 5. In FIG. 5, numeral 301 denotes a memory for storing picture data inputted via an input terminal 305. Numeral 302 denotes a comparator for performing comparison on picture data. Numeral 303 denotes a data table storing various data. Numeral 304 denotes a controller for controlling the memory 301, the comparator 302, and the data table 303. Numeral 306 denotes an output terminal for outputting the comparison result of the comparator.

The controller 304 counts data inputted from the input terminal 305 and causes the memory 301 to store a portion of picture data in which data having a specific value is considered to appear. Concurrently therewith, the controller 304 calls, from the data table 303, a pattern of picture data having the specific value and causes the comparator 302 to compare the value stored in the memory 301 with the output of the data table 303. If these values do not coincide, then the inputted data is judged to contain some error, and the ERR detection signal is outputted from the output terminal 306 of the comparator 302 to the control circuit 16.

Figure 6:
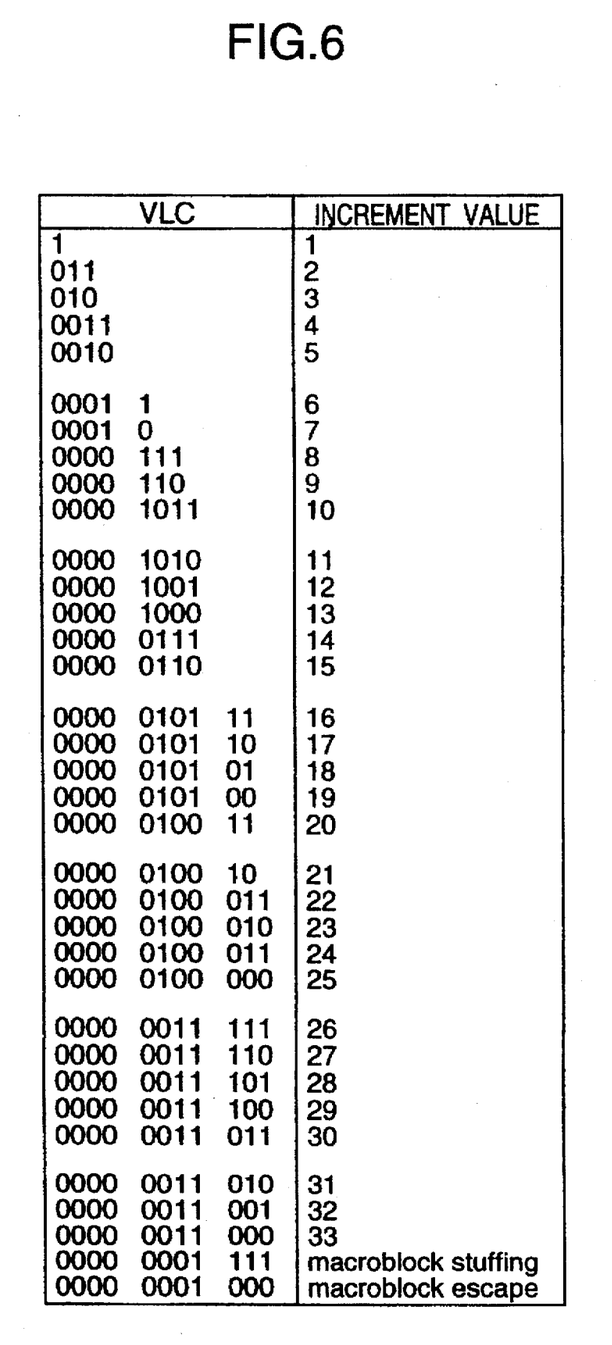
FIG. 6 shows a table of variable length codes in the MPEG video standard.

Another example will now be described. As for the variable length code mentioned before as one of means for reducing the data capacity, values which can appear are predetermined as shown in FIG. 6. Besides, there are some data such as the picture type for which values are predetermined and thus appear as correct ones. To the analysis means (corresponding, for example, to the memory 301 plus the comparator 302 plus the data table 303), therefore, means for judging data as containing an error in the case where a value other than values the data can assume has appeared and then outputting the error detection signal ERR may be added.

The control circuit 16 is configured so that upon receiving the error detection signal ERR outputted by the error detector 18 restoration process for the normal decoding operation state as hereafter described will be conducted.

The restoration process performed by the control circuit 16 when a decoding error has occurred or has been detected in the above described moving picture decoding apparatus 10 will now be described by referring to a flow chart shown in FIG. 7. Since the restoration process varies according to the circuit configuration and scheme of the decoding apparatus, the present embodiment shows only an example.

Figure 7:
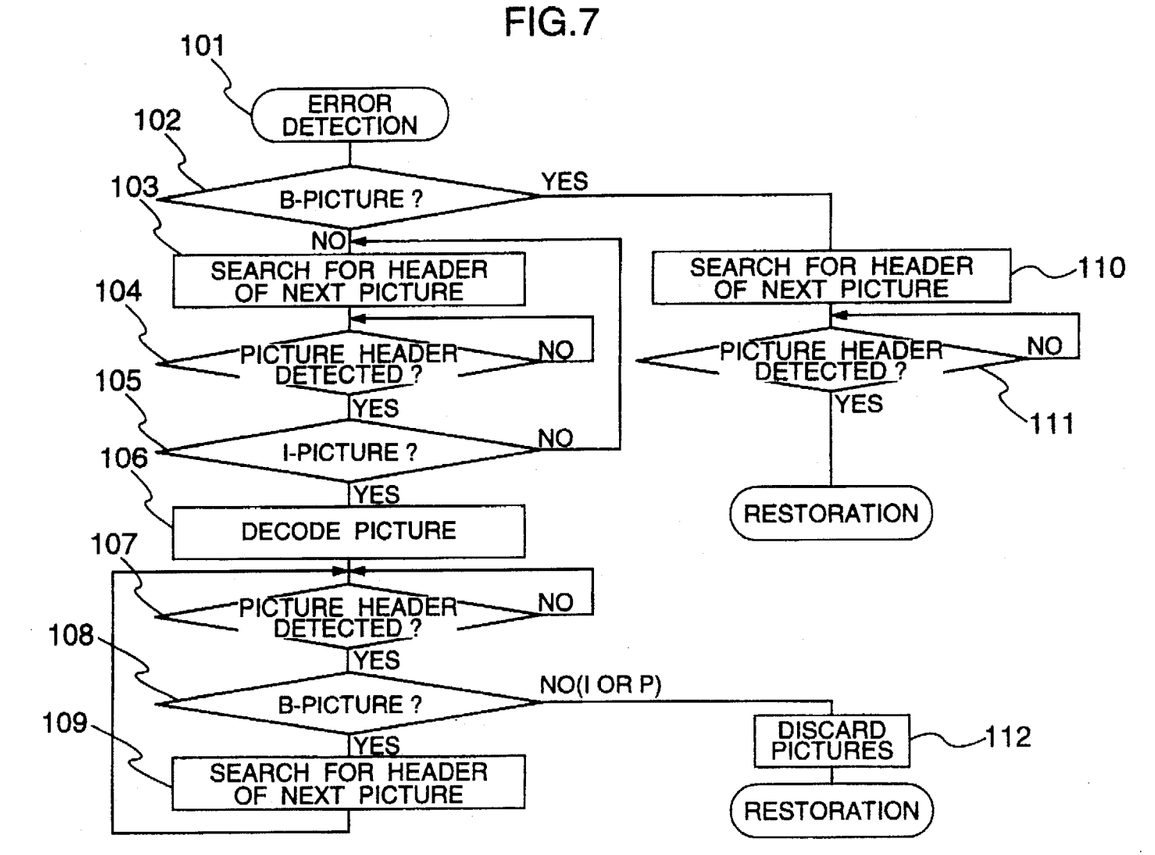
FIG. 7 is a flow chart showing an example of a procedure for restoring a normal decoding operation state upon detection of a decoding error in a moving picture decoding apparatus according to an embodiment of the present invention.

The flow in the flow chart shown in FIG. 7 will hereafter be described.

When an error is detected in the normal decoding operation, the error detector 18 generates an error signal ERR, and the control circuit 16 performs a control operation including step 101 et seq. shown in FIG. 7. At step 102, it is judged whether the picture data in which the error has occurred or has been detected is an I-picture data or a P-picture data which may be a reference picture data, or a B-pictire data which is never a reference picture data. According to the result, branching to respective routines is effected. The type of each picture data is judged on the basis of information stored in the header of the picture layer of the inputted picture data (as shown in FIG. 4).

When the picture data in which the error has occurred is an I-picture data or a P-picture data which may be a reference picture data, then picture data thereafter decoded by using the error containing picture data as the reference picture will be subjected to the influence of the error and consequently the decoding does not produce a correct result. Furthermore, picture data thereafter decoded by using picture data subjected to the influence of the error as reference picture data will also be subjected to the influence of the error. If an error has been detected when an I-picture or a P-picture is decoded, therefore, error-free decoding is to be conducted, in the present embodiment, from the time when an I-picture which does not need a reference picture data has appeared again.

If the picture data in which an error has occurred is an I-picture data or a P-picture data in the present embodiment, therefore, control is transferred to step 103. At this step, the header of the next picture data is searched for and thereby the picture data in which the error has occurred is skipped. At the next step 104, it is judged whether the header of picture data has been detected. If the header of picture data has not been detected, the step 104 is repeated until it is detected.

Specifically, the picture data skipping may be effected as follows. An error containing picture data is decoded by the variable length decoder 11 with the decoded result stored in the buffer memory 20. In consideration of the error contained in the stored picture data, the output circuit 15 operates to read out, from the buffer memory 20, a picture data prior to the error containing picture instead thereof. The above-mentioned operation of the output circuit is performed under control of the control circuit 16 such that the circuit 16 supplies to the buffer control circuit 14 a control signal φ4 designating an address of the picture data prior to the error containing picture.

If the header of the next picture data has been detected at step 104, control is transferred to step 105. At step 105, the type of the picture data is read out of information of the header of the picture layer of picture data called "picture start code," and it is judged whether the picture data is an I-picture data. If it is a picture data other than I-picture data, then control is returned to step 103 by the above described reason and the next picture data is searched for again. If an I-picture data has been detected at step 105, the picture data is decoded at step 106. Upon the above error detection, the picture data already decoded before the error detection is outputted continuously until the picture of I-type detected at step 105 is decoded and outputted.

If the next picture data is a B-picture data, two picture data of I-type or P-type correctly decoded and used as reference picture data are needed as described above for the B-picture data to be correctly decoded. In the present embodiment, therefore, B-picture data are skipped. Thus, restoration of the normal decoding procedure cannot be immediately performed from the step 106. After an I-picture data has been decoded, control is transferred to a succeeding step 107. At step 107, the header of a succeeding picture is searched for in the same way as step 103. If the header of the next picture has been detected, the type of the picture data is discriminated at step 108. If the picture is a B-picture data which cannot be used as a reference picture data, control is transferred to step 109. At step 109, the header of a suceeding picture data is searched for. Then the control is returned to step 107 again. In this way, input picture (B-type) data are skipped until a picture data of I-type or P-type appears.

If a picture data of I-type or P-type which may be used as a reference picture data has been detected at step 108, then it is possible to follow the normal decoding procedure thereafter, and consequently the control is transferred to step 112. At step 112, the error containing picture data are discarded (i.e., the error containing picture data are overwritten with newly decoded picture data at their addresses) with only picture data under display are left in the buffer memory 20. Thereafter, the normal decoding procedure is restored. As for the output picture data, the picture data of I-type decoded at step 106 is continuously outputted until the picture data of I-type or P-type detected at step 108 is decoded and outputted. The step 112 may be executed not immediately before the restoration but immediately after entering the error process.

On the other hand, if the picture data in which the error has occurred is judged to be a B-picture data at step 102 located at the top of the flow, only that B-picture data must be discarded, because B-picture data are not used as reference pictures. Therefore, the control is transferred to step 110 and succeeding picture data is searched for. Thus the B-picture data in which the error has occurred is skipped. Thereafter, it is determined at step 111 whether the header of the next picture has been detected. When the header of the next picture has been detected with an output from the variable length decoder 11, the normal decoding procedure is restored. As for the output picture, the picture data already decoded before the error detection is outputted in succession for a time corresponding to one picture data instead of the B-picture data in which the error has occurred.

Figure 9:
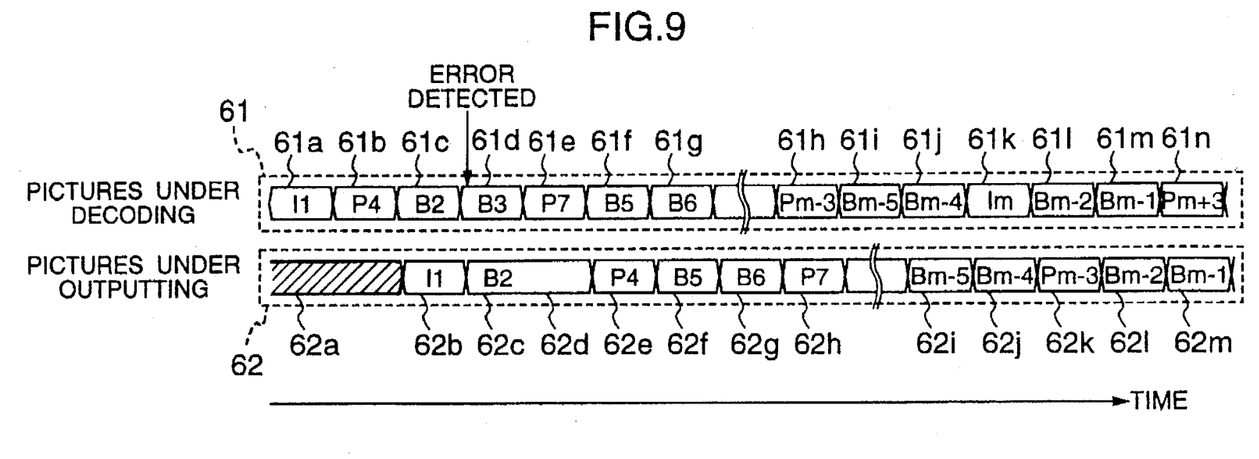
FIG. 9 is a timing chart of a picture output obtained according to the procedure of FIG. 7 upon detection of an error in a B-picture.
Figure 10:
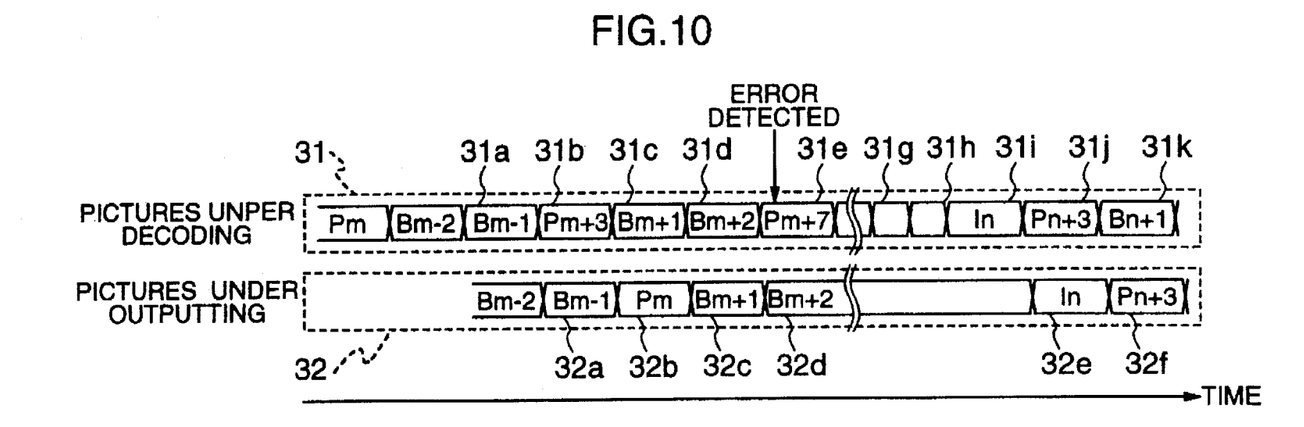
FIG. 10 is a timing chart of a picture output obtained according to the procedure of FIG. 7 upon detection of an error in a P-picture

FIG. 9 shows output timing in the case where the picture data in which an error has occurred is a B-picture data. FIG. 10 shows output timing in the case where the picture data in which an error has occurred is a P-picture data.

When the picture data in which an error has occurred is a B-picture data (for example, such as B3) as shown in FIG. 9, then only that picture data (B3) is skipped and only a picture data (B2) inputted immediately before the picture data (B3) and already decoded is outputted in succession. Namely, the control circuit 16 performs a control operation such that even when the picture data B3 is stored in the buffer memory 20, the output circuit 15 is prevented from reading out the picture data B3. Alternately, the control circuit 16 may perform a control operation such that, even if the picture data B3 were decoded at the variable length decoder 11, the decoding result would not be stored in the buffer memory 20.

When the picture in which an error has occurred is a P-picture data (for example, such as 31e (Pm+7) as shown in FIG. 10), then all picture data including that picture data and picture data using that picture 31e as reference picture data are discarded until a succeeeding I-picture data 32e (In) appears. An input picture data decoded before the picture data 31e in which the error has been detected, for example, such as a picture data (Bm+2) under output when the error has occurred, is outputted in succession until a picture data 32e obtained by decoding a picture data 31i is outputted. Alternately, picture data may be outputted in order up to a picture (for example, such as Pm+3) inputted before the picture data (Pm+7) in which the error data has been detected, and which has been decoded without being subjected to the influence of the error, has not yet been outputted, and located nearest to the picture in which the error has been detected, and that picture (Pm+3) may be further outputted continuously until the I-picture data 31i (In) is decoded and outputted.

Figure 8:
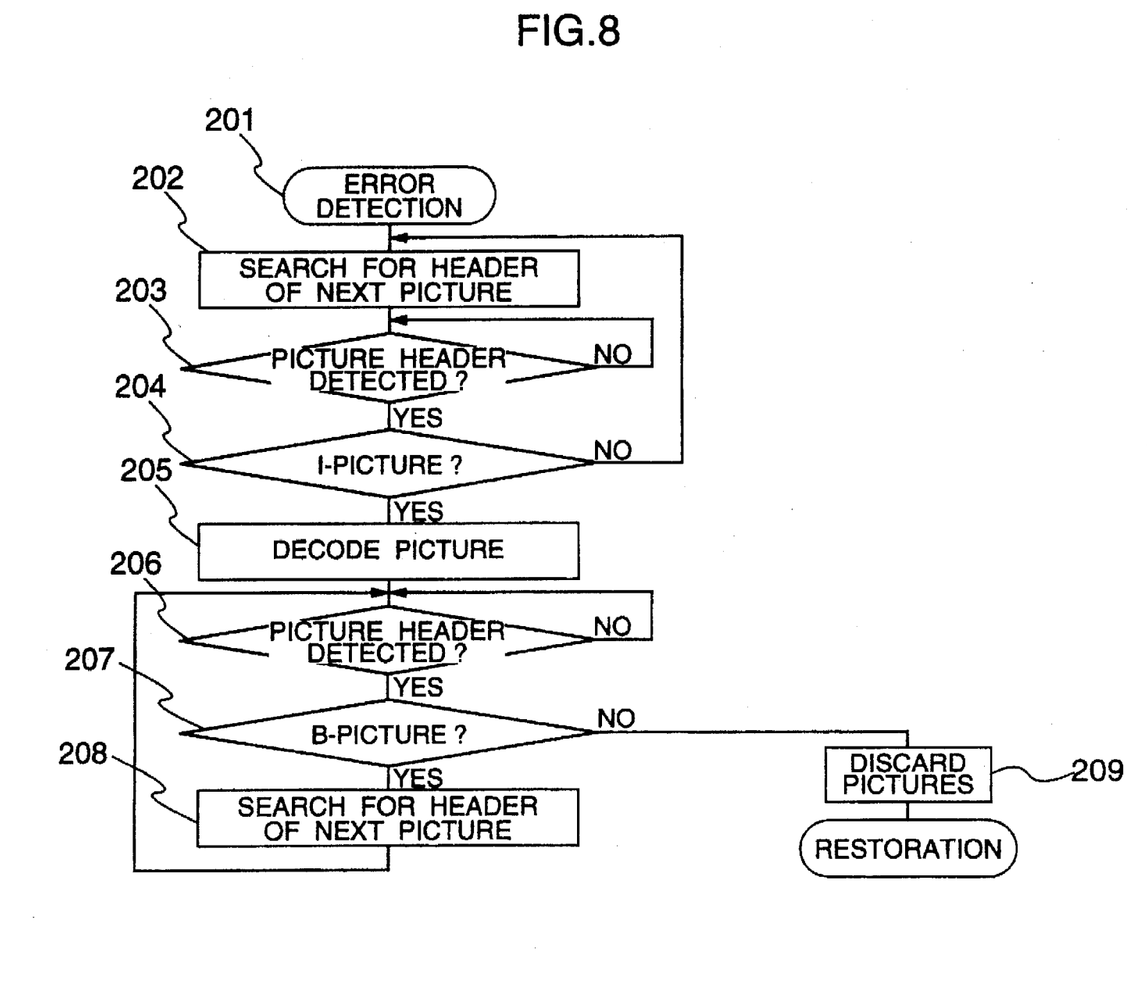
FIG. 8 is a flow chart showing another example of a procedure for restoring a normal decoding operation state upon detection of a decoding error in a moving picture decoding apparatus according to an embodiment of the present invention.

FIG. 8 is a flow chart showing another example of restoration process conducted when a decoding error has been detected in a moving picture decoding apparatus according to another embodiment of the present invention.

In the embodiment shown in FIG. 7, decoding errors are coped with in different ways according to the the type of the picture data in which the error has been detected. If it is attempted to implement the restoration process by using a logic circuit on an integrated circuit, however, then the circuit scale may be increased because of abundance of functions, resulting in a cost increase. Thus, a scheme aiming at reduction of the circuit scale by reducing the functions is this embodiment.

The flow of the present flow chart will hereafter be described.

When a decoding error is detected (when the variable length detector 11 generates an error signal ERR), the control circuit 201 performs a control operation including step 201 et seq. In the embodiment of FIG. 7, the picture type is discriminated at this step. In the present embodiment, however, the header of succeeding picture data is searched for at succeeding step 202. Thereby, the data in which the error has been detected is skipped and it is determined at step 203 whether the header of picture data has been detected.

If the header of the next picture data has been detected, the type of that picture is discriminated at succeeding step 204. Unless the picture is an I-picture data, the control is returned to step 202 again. If an I-picture data has been detected at step 204, then the control is transferred to step 205 and that picture data is decoded. Upon the above error detection, a picture data decoded before the error detection is outputted consecutively until an I-picture data detected at step 205 is decoded and outputted.

In order that picture data of B type appearing subsequently after the decoding of the I-picture data are prevented from being decoded, the header of a picture data is detected at step 206 and it is determined at step 207 whether or not that picture data is a B-picture data. If the picture data is a B-picture data, then the control is transferred to step 208 and searching a succeeding picture data is repeated until a picture data other than B-picture data appears. Input picture (B type) data are thus skipped until an I-picture data or a P-picture data appears. When a picture data other than B-picture data has appears, the control is transferred to step 209 and all picture data held in the buffer memory are discarded while leaving only the picture data under display located immediately before the error detection in the buffer memory 20. And the normal decoding operation is restored. As for the output picture, the I-picture data decoded at step 205 is outputted continuously until the I-picture data or P-picture data detected at step 207 is decoded and outputted.

When an error has been detected in a B-picture data, originally only the B-picture data need be discarded. By using the flow described heretofore, however, a few picture data may be dropped even when an error has been detected only in a B-picture data. However, restoration process from the decoding error can be realized with a simpler circuit configuration and a simpler algorithm.

Figure 11:
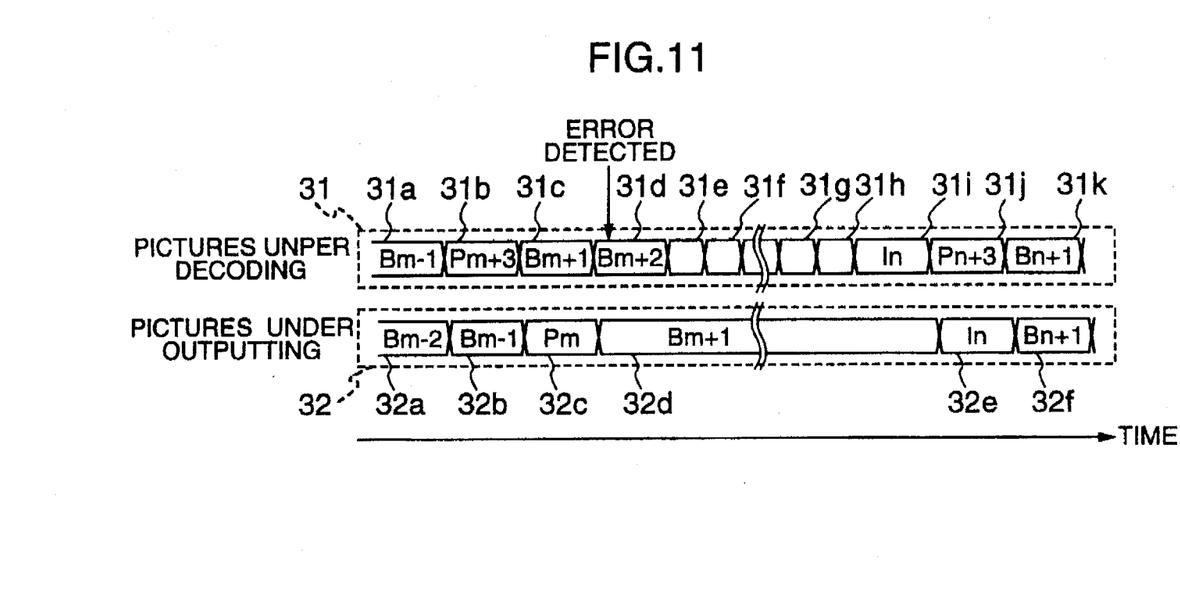
FIG. 11 is a timing chart of a picture output obtained according to the procedure of FIG. 8 upon detection of an error in a B-picture.

FIG. 11 shows a train of picture data outputted in a case where a decoding error has been detected in a B-picture in the embodiment shown in FIG. 8. In FIG. 11, numeral 31 denotes a train of input picture data to be decoded. Among inputted picture data, picture data 31a through 31d and 31i through 31k are decoded. Among inputted picture data, those 31e through 31h are skipped. Numeral 32 denotes a train of output picture data. Even when an error is detected in a B-picture data which is not used as a reference picture data, all picture data (including a normal picture Pm+3) stored in the buffer memory at that time are discarded. Together therewith, all picture data are skipped until a succeeding picture data of I-type (In) appears and they are not decoded. Comparison of FIG. 9 with FIG. 11 will clarify differences in way of process between the embodiment of FIG. 7 and the embodiment of FIG. 8.

Figure 13:
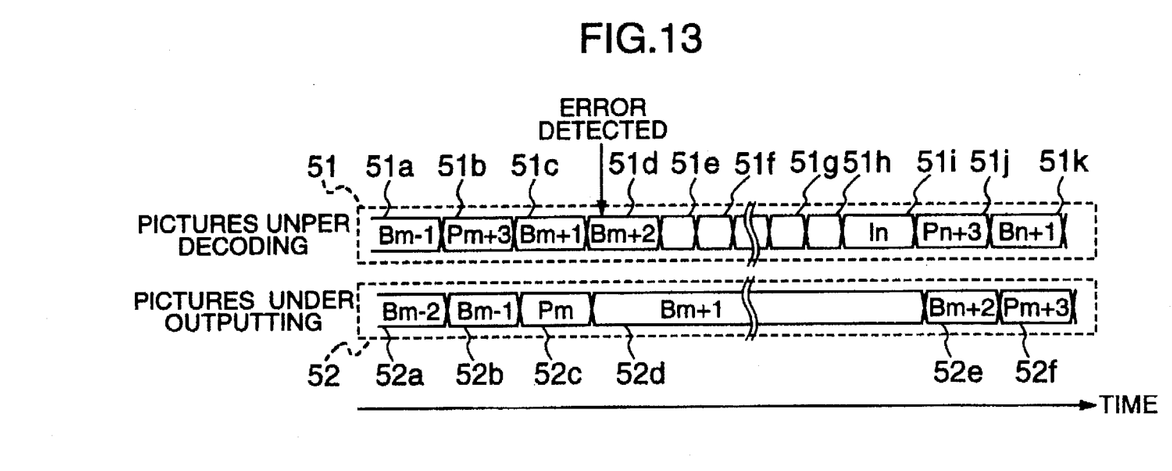
FIG. 13 is a timing chart of a picture output obtained upon detection of an error in a moving picture decoding apparatus.

On the other hand, in the case where the picture data in which an error has occurred is not discarded, even the picture data (Bm+2) in which the error was detected and decoding failed is outputted as shown in FIG. 13, resulting in a lowered output quality. In FIG. 13, numeral 51 denotes a train of input picture data to be decoded. Among the inputted picture data, those 51a through 51d and 51i through 51k are decoded. Among inputted picture data, those 51e through 51h are skipped. Numeral 52 denotes a train of output picture data. Picture data 52e is a defective output picture data obtained by decoding the input picture data 51d (Bm+2) in which an error has occurred.

Illustrated characters represent types and output orders of picture data. For example, In-1 represents a picture data of I type to be outputted as a (n-1)th picture data.

In FIG. 13, an error is detected while the picture data 51d (Bm+2) is decoded. As restoration operation from the error, therefore, input picture data 51e through 51h are skipped and decoding is restarted from the picture 51i which is a picture data of I type appearing susequently. The normal operation is thus restored.

In this example, the picture data outputted when the error has been detected is a picture data 52d (Bm+1). As picture data already decoded and not yet outputted, there are the picture data 51b (Pm+3) and the picture data 51d (Bm+2) in which the error has occurred. Until the restoration process from the error state is finished, however, the picture data 52d (Bm+1) continues to be outputted. If contents stored in the picture memory allocated to the picture data 51d (Bm+2) when an error has occurred are not discarded, display is continued for a picture data 52e (Bm+2) and then for a picture data 52f (Pm+3) after restoration from the error. However, decoding is incomplete because the error has occurred in the picture data 52e (Bm+2). If left as it is, the quality of the moving pictures will be degraded.

In the embodiment of FIG. 8, picture data which are to be outputted after the error containing picture data 51d (Bm+2) and which are inputted/decoded before and after the picture data 51d are discarded as in the timing chart shown in FIG. 11. Upon restoration from the error, outputting is restarted in new order from a portion in which decoding has been restarted. Thus defective picture data are prevented from being outputted. It is thus possible to suppress degradation of quality as moving pictures.

In FIG. 11, the process conducted until an error has been detected is the same as that of FIG. 13. When an error has been detected, picture data (31e-31h) excepting a picture data under output (the picture data 32d in FIG. 11) are discarded. When restoration from the error is completed and continuation of output is made possible, the picture data 31i (In) of I type is newly outputted as the decoded picture data 32e.

Figure 12:
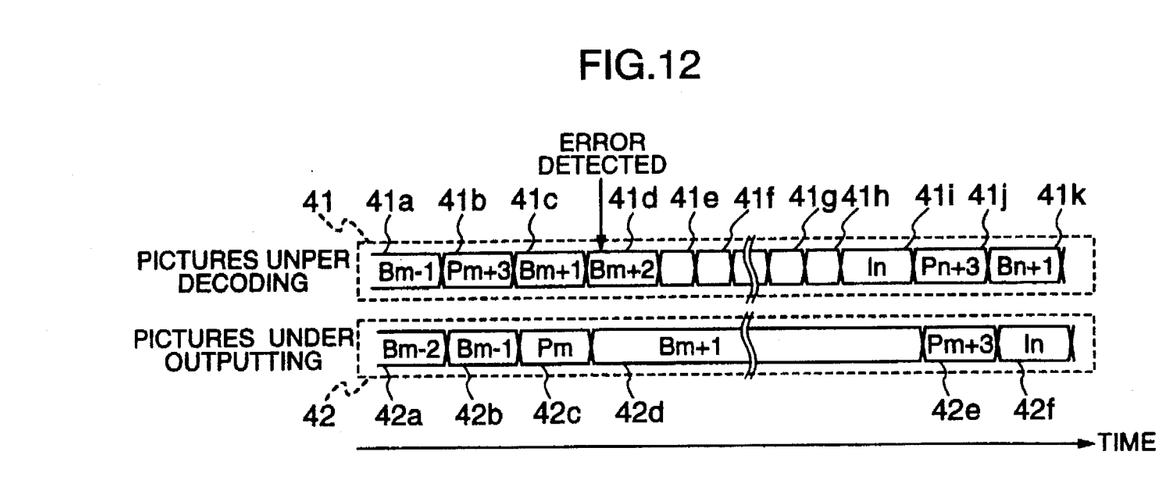
FIG. 12 shows another example of a timing chart of a picture output obtained upon detection of an error in a B-picture in a moving picture decoding apparatus according to an embodiment of the present invention.

As a variant of output timing chart shown in FIG. 11, the discarded picture may be limited to the defective picture data as shown in FIG. 12. In FIG. 12, numeral 41 denotes a train of input picture data to be decoded. Among the inputted picture data, those 41a through 41d and 41i through 41k are decoded. Among the inputted picture data, those 41e through 41h are skipped. Numeral 42 denotes a train of output picture data. In this embodiment, the picture data discarded at the time of error detection is only the picture data 41d (Bm+2) in which an error has been detected. The normal picture data 41b (Pm+3) for which decoding has already been finished at the time of error detection is not discarded, and it is outputted as a picture data 42e when restoration from the error has been effected. Thereafter, picture data generated by restarted decoding are outputted in succession. Thereby smoothness of moving pictures is assured.

In the case where an error has been detected in the decoding process, there is a possibility that the error might not have occurred in a picture now under decoding but during decoding of an immediately preceding picture or in a decoding stage of a reference picture data. In the case where an error has been detected but it is difficult to determine when the error has occurred, therefore, it is desirable to discard all possible picture data to suppress degradation of picture quality.

Alternately in the embodiments of FIGS. 7 and 8, the steps 112 and 209 of discarding picture data which are held in the buffer memory 20 and which are not yet outputted may be omitted. In such a case, at least the picture data in which the error has been detected and picture data inputted until a reference picture data appears thereafter are skipped and discarded, and consequently degradation of picture quality can be suppressed to some degree.

As heretofore described, in the case where an error has been detected at the time of decoding a picture data which may be used as a reference picture data in a moving picture decoding apparatus using, as the case demands, decoded picture data as reference picture data according to the embodiment described by referring to FIGS. 7 and 10: a picture data decoded before the picture data in which the error has been detected (for example, such as a picture data inputted immediately before the picture data in which the error has been detected and already decoded or a picture under output at the time of error detection) is continuously outputted, with picture data which have been already decoded and are be outputted subsequently to the error containing picture data being discarded until an input picture data which may be used as a reference picture data and which can be decoded without being subjected to influence of the error appears thereafter and is decoded and outputted; the thereafter appearing input picture data is decoded and continuously outputted, with picture data which have been already decoded and are to be outputted subsequently to the decoded and outputted picture being discarded until a picture data referring to only a reference picture data or another input picture which can be decoded without being subjected to influence of the error appears; the second-mentioned appearing picture is decoded and outputted subsequently to the second-mentioned continuously outputted picture data, and thereafter normal decoding is re-started. Even if an error is detected during decoding, therefore, input picture data are skipped until picture data of a type which does not need a reference picture data appears, and normal decoding operation is re-started for subsequent picture data. Thus decoding can be done without degrading the picture quality.

Furthermore, decoding with suppressed degradation of picture quality can be performed without using complicated hardware.

In the case where an error has been detected at the time of decoding, all picture data already decoded and not yet outputted are discarded and the picture data being outputted when the error is detected is repetitively outputted until the normal decoding is restarted. Therefore, the configuration can be further simplified.

While the invention made by the present inventors has heretofore been described specifically on the basis of embodiments, the present invention is not limited to the above described embodiments. As a matter of course, various alterations can be made without departing from the spirit of the present invention. For example, in the description of the embodiments, the case where the moving picture decoding apparatus is implemented as a special purpose semiconductor integrated circuit has been described. However, the present invention may be applied to the case where the moving picture decoding apparatus is implemented by using a general purpose DSP (digital signal processor). In that case, the present invention is realized by using the operation program of the DSP, i.e. software of the DSP.

Heretofore, the invention made by the present inventors has been described by taking, as an example, a MPEG video decoder which is the utilization field forming the background thereof. As far as the moving picture decoding apparatus uses time-based prediction, the present invention can be applied thereto.

As has been described, degradation of the picture quality can be effectively suppressed when a decoding error has occurred in a moving picture decoding apparatus by employing a simple algorithm.

We claim:

1. An apparatus for decoding a train of coded input picture data carrying moving picture information and outputting the decoded train, comprising:

error detection means for detecting an error in said train of input picture data;

picture type descrimination means for determining whether a picture data having an error detected by said error detection means is of a type used as reference data;

first picture discarding means, responsive to an output of said picture type descrimination means that said picture data having the detected error is of a type used as reference data, for discarding input picture data until thereafter picture data of a type used as reference data capable of being decoded without being subjected to influence of said error newly appears; and second picture discarding means for discarding input picture data after said newly appearing picture data has been decoded until picture data decoded by referring to only said decoded picture data appears or another picture data of the type used as reference data capable of being decoded without being subjected to influence of said error appears.

2. An apparatus according to claim 1, further comprising output interruption preventing means, responsive to detection of an error in one of said input picture data, for discarding all output picture data already decoded and not yet outputted and for repetitively outputting a picture data outputted at the time of error detection until normal decoding is restarted.

3. An apparatus according to claim 1, further comprising:

third picture discarding means, responsive to detection of an error in one of input picture data, for selecting and discarding those picture data which are subjected to influence of the error among picture data already decoded and not yet outputted; and output means for outputting un-outputted picture data not discarded, before outputting picture data decoded after re-start of normal decoding.

4. A method of decoding a train of coded input picture data carrying moving picture information and outputting the decoded train, comprising the steps of:

in response to detection of an error in one of the input picture data, discarding input picture data until a picture data of a type used as reference data capable of being decoded without being subjected to influence of the error appears;

discarding input picture data after decoding said picture data of a type used as reference data until picture data referring to only said decoded picture data appears;

decoding said picture data referring to only said decoded picture data; and thereafter re-starting normal decoding.

5. A method according to claim 4, comprising the steps of:

in response to detection of an error in one of the input picture data, selecting and discarding those picture data which are subjected to influence of the error among picture data already decoded and not yet outputted;

repetitively outputting a picture data outputted at the time of error detection until normal decoding is re-started; and outputting un-outputted picture data not discarded, before outputting picture data decoded after re-start of normal decoding.

6. A method for decoding a train of coded input picture data carrying moving picture information and outputting the decoded picture data in predetermined order, decoding of at least one picture data included in said train of coded input picture data requiring reference to another picture data, at least one coded picture data included in said train of coded input picture data being possibly subjected to an error, the method comprising:

a first step of checking picture data in said train of inputted picture data successively in an inputted order to determine whether the picture data of said train of inputted picture data have been subjected to an error;

a second step of, upon detection of an error in a first input picture data in said train of input picture data, skipping said first input picture data and succeeding input picture data without decoding them until a second input picture data, decoding of which requires no reference to another picture data, appears, and outputting consecutively a third picture data having been inputted prior to said first input picture data having the detected error and having been already decoded;

a third step of decoding said second input picture data, decoding of which requires no reference to another picture data, and outputting the decoded picture data after said third decoded picture data outputted consecutively; and a fourth step of skipping picture data succeeding said second input picture data without decoding them until a fourth input picture data, decoding of which requires no reference to another picture data or a fourth input picture data, decoding of which requires reference to said second decoded picture data, appears, and outputting consecutively a picture data obtained by decoding said second input picture data, until said fourth input picture data is decoded and outputted.

7. A method according to claim 6, wherein said second step comprises the step of continuously outputting said third decoded picture data until said second input picture data, decoding of which requires no reference to another picture data is decoded and outputted; and said third step comprises the step of outputting a picture data obtained by decoding said second input picture data subsequently to said continuously outputted third decoded picture data.

8. A method according to claim 6, further comprising:

a fifth step of determining whether said first input picture data in which an error has been detected is a picture data, decoding of which requires reference to two other picture data, one of said two other picture data being decoded input picture data to be outputted before the first input picture data, the other of said two other picture data being decoded input picture data to be outputted after the first input picture data, said fifth step being executed between said first and second steps;

a sixth step of skipping said first input picture data without decoding it and outputting in succession said decoded third input picture, in the case where it is determined at said fifth step that said first input picture data in which an error has been detected is a picture data, decoding of which requires reference to two other picture data; and executing in succession said second through fourth steps, in the case where it is determined at said fifth step that said first input picture data in which an error has been detected is a picture data, decoding of which requires no reference to two other picture data.

9. A method according to claim 6, wherein said third step includes:

outputting, subsequently to said continuously outputted third decoded picture data, a picture data which has been inputted before said first input picture data, has been decoded, and is to be outputted before second input picture data; and decoding said second input picture data and outputting said decoded second input picture data.

10. A method according to claim 6, wherein said third decoded picture data to be consecutively outputted at said second step is a picture data under output at the time of said error detection.

* * * * *